(12) United States Patent
Riverso et al.

(10) Patent No.: US 11,561,021 B2
(45) Date of Patent: Jan. 24, 2023

(54) METHOD FOR RESPONDING TO ELECTRICAL POWER SOURCE REQUEST

(71) Applicant: CARRIER CORPORATION, Palm Beach Gardens, FL (US)

(72) Inventors: Stefano Riverso, Cork (IE); Marcin Cychowski, Cork (IE)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/850,259

(22) Filed: Apr. 16, 2020

(65) Prior Publication Data

US 2020/0333032 A1    Oct. 22, 2020

Related U.S. Application Data

(60) Provisional application No. 62/834,533, filed on Apr. 16, 2019.

(51) Int. Cl.
*G05B 19/042*    (2006.01)
*F24F 11/46*    (2018.01)
*F24F 11/64*    (2018.01)

(52) U.S. Cl.
CPC .............. *F24F 11/46* (2018.01); *F24F 11/64* (2018.01); *G05B 19/042* (2013.01); *G05B 2219/2614* (2013.01)

(58) Field of Classification Search
CPC .. F24F 11/46; F24F 11/64; F24F 11/65; F24F 11/47; G05B 19/042; G05B 2219/2614; Y02B 70/3225; Y04S 20/222; H02J 13/00004; H02J 2310/60; H02J 2310/62; H02J 3/14; H02J 3/00; H02J 3/008
USPC ........................................................ 700/276
See application file for complete search history.

(56) References Cited

U.S. PATENT DOCUMENTS

| | | | |
|---|---|---|---|
| 8,571,955 B2 | 10/2013 | Al Faruque et al. | |
| 8,872,379 B2 | 10/2014 | Ruiz et al. | |
| 8,880,231 B2 | 11/2014 | Boucher et al. | |
| 8,957,634 B2 | 2/2015 | Lo et al. | |
| 9,367,108 B2 | 6/2016 | Asghari et al. | |
| 9,429,927 B2 | 8/2016 | Nesler et al. | |
| 9,667,107 B2 | 5/2017 | Yamada et al. | |
| 9,731,615 B2 | 8/2017 | Uyeki et al. | |
| 9,740,183 B2 | 8/2017 | Chen | |
| 2009/0020173 A1* | 1/2009 | Lau ....................... | F04D 15/029 137/565.01 |

(Continued)

OTHER PUBLICATIONS

Hao et al. "Transactive Control of Commercial Buildings for Demand Response", IEEE Transactions on Power Systems, vol. 32, No. 1, Jan. 1, 2017, pp. 774-783.
Di Somma et al. "Optimal Bidding Strategy for a DER Aggregator in the Day-Ahead Market in the Presence of Demand Flexibility", IEEE Transactions on Industrial Electronics, vol. 60, No. 2, Feb. 1, 2019, pp. 1509-1519.

(Continued)

*Primary Examiner* — Michael W Choi
(74) *Attorney, Agent, or Firm* — Carlson, Gaskey & Olds, P.C.

(57) ABSTRACT

A method of estimating power flexibility for a climate system includes receiving a component power flexibility measurement from one or more components of the climate system, and aggregating the component power flexibility measurement from each of the one or more components of the climate system to determine a climate system power flexibility. A method of responding to a fast demand request from an electrical power source for a climate system is also disclosed.

19 Claims, 4 Drawing Sheets

(56) References Cited

U.S. PATENT DOCUMENTS

| | | |
|---|---|---|
| 2010/0017045 A1 | 1/2010 | Nesler et al. |
| 2010/0138363 A1 | 6/2010 | Batterberry et al. |
| 2015/0045962 A1* | 2/2015 | Wenzel ................. G06F 1/3203 700/276 |
| 2015/0167997 A1* | 6/2015 | Saffre ..................... F24F 11/30 700/276 |
| 2015/0276253 A1* | 10/2015 | Montalvo ............... H04L 12/12 700/276 |
| 2016/0334825 A1 | 11/2016 | Nesler et al. |
| 2017/0089601 A1 | 3/2017 | Patil et al. |
| 2017/0102162 A1 | 4/2017 | Drees et al. |
| 2017/0163084 A1 | 6/2017 | Malone |
| 2017/0177766 A1 | 6/2017 | Song et al. |
| 2017/0207633 A1 | 7/2017 | Nakayama et al. |
| 2017/0256004 A1 | 9/2017 | Hooshmand et al. |
| 2018/0196456 A1 | 7/2018 | Elbsat |
| 2018/0287382 A1 | 10/2018 | Genc et al. |
| 2020/0184395 A1* | 6/2020 | Fabris ..................... G06F 17/18 |

OTHER PUBLICATIONS

Aduda et al., "Demand Side Flexibility Coordination in Office Buildings: A Framework and Case Study Application", Sustainable Cities and Society, vol. 29, Dec. 26, 2016, pp. 139-158.

Hao et al., "Distributed Flexibility Characterization and Resouice Allocation for Multi-zone Commercial Buildings in the Smart Grid", 2015 IEEE Conference on Decision and Control (CDC), Dec. 15, 2015, pp. 3161-3168.

Nandanoori et al., "Prioritized Threshold Allocation for Distributed Frequency Response", 2018 IEEE Conference on Control Technology and Applications (CCTA), Aug. 21, 2018, pp. 237-244.

Chen et al., "Measures to Improve Energy Demand Flexibility in Buildings for Demand Response (DR): A Review", Energy and Buildings, vol. 177, Aug. 11, 2018, pp. 125-139.

The Extended European Search Report for European Patent Application No. 20167328.2 dated Aug. 11, 2020.

\* cited by examiner

METHOD FOR RESPONDING TO ELECTRICAL POWER SOURCE REQUEST

CROSS-REFERENCE TO RELATED APPLICATIONS

This application claims priority to U.S. Provisional Application No. 62/834,533, which was filed on Apr. 16, 2019, and is incorporated herein by reference.

BACKGROUND

Buildings, such as university buildings, office buildings, residential buildings, commercial buildings, and the like, incorporate one or more electrically powered systems and devices. The electrically powered systems and devices, or loads, can be powered at least partially by electricity supplied from a centralized electrical power source or utility ("electrical grid"). The electrically powered systems and devices communicate with the electrical grid regarding power demand and availability.

SUMMARY

A method of estimating power flexibility for a climate system according to an example of this disclosure includes receiving a component power flexibility measurement from one or more components of the climate system, and aggregating the component power flexibility measurement from each of the one or more components of the climate system to determine a climate system power flexibility.

In a further example of the foregoing method, the climate system power flexibility is communicated to an electrical power source.

In a further example of any of the foregoing methods, a request is received for the climate system power flexibility from an electrical power source prior to the receiving step.

In a further example of any of the foregoing methods, the electrical power source is a smart grid.

In a further example of any of the foregoing methods, the smart grid sends the request for the climate system power flexibility at a time of peak electrical demand.

In a further example of any of the foregoing methods, one or more components includes at least one of a chiller, a pump, and an air handling unit.

In a further example of any of the foregoing methods, a request is received for a fast demand response from an electrical power source, the request for the fast demand response includes a power demand. It is then determined whether the power demand is within the climate system power flexibility.

In a further example of any of the foregoing methods, the fast demand response is delivered to the one or more components when the power demand is within the climate system power flexibility.

A method of responding to a fast demand request from an electrical power source for a climate system that includes one or more components according to an example of this disclosure includes determining whether a new power demand from the electrical power source is within an aggregated power flexibility of the climate system including one or more components. The method includes distributing a power set point to one or more components when the new power demand is within the aggregated power flexibility of the climate system.

In a further example of the foregoing method, the power demand includes a reward.

In a further example of any of the foregoing methods, a check is performed to determine whether the fast demand request is complete after the distributing step.

In a further example of any of the foregoing methods, the fast demand request is redistributed to one of more components if the fast demand request is not complete.

In a further example of any of the foregoing methods, the power set point of each one of the one or more components is within a power flexibility of the respective component.

In a further example of any of the foregoing methods, one or more components are operated on at the power set point of each one of the one or more components.

In a further example of any of the foregoing methods, one or more components include at least one of a chiller, a pump, and an air handling unit.

In a further example of any of the foregoing methods, one or more components include a chiller. The chiller includes a motor having a variable speed drive.

In a further example of any of the foregoing methods, the operating includes changing the speed of the variable speed drive.

In a further example of any of the foregoing methods, the distributing is performed by a climate system controller, and the climate system controller determines the power set point for each of the one or more components.

In a further example of any of the foregoing methods, the climate system controller distributes the power set point for each one of the one or more components to a controller at each of the one or more components.

In a further example of any of the foregoing methods, one or more operating parameters are communicated from at least one of the one or more components to at least one of the climate system controller and the controller at each one of the one or more components.

DETAILED DESCRIPTION

Demand-side management (DSM) for electric systems and devices includes various methods and directives for reducing power demand on centralized electrical power sources by electrical systems and devices. These methods and directives can include incorporating energy sources other than electrical power, (e.g., solar power or other forms of renewable energy), incorporating electrical power storage systems, and controlling flexible power demands. Generally, the electrical power source is in communication with the systems or devices (e.g., one or more load) to which it provides electrical power. The electrical power source and load share information and make decisions about how and when to produce and consume electrical power. In this way, DSM allows an electrical power source, such as a "smart" electrical grid, to balance power production and consumption.

Where the power demand of the load is flexible, DSM can be employed to improve the efficiency of power generation. The electrical power source communicates information about power generation and consumption to the electrical systems/devices. In this way, the electrical systems/devices can respond to the information from the electrical power source. For instance, at peak electrical demand times, the electrical systems/devices can reduce power consumption.

Buildings incorporate at least one load, such as climate control or heating, ventilation, and air conditioning (HVAC) system, lighting systems, security systems, and the like. Some of these systems may have flexible power demands which change over time. For instance, the climate system power demand varies with building occupancy, exterior climate, occupant comfort requirements, and the like.

Figure 1:
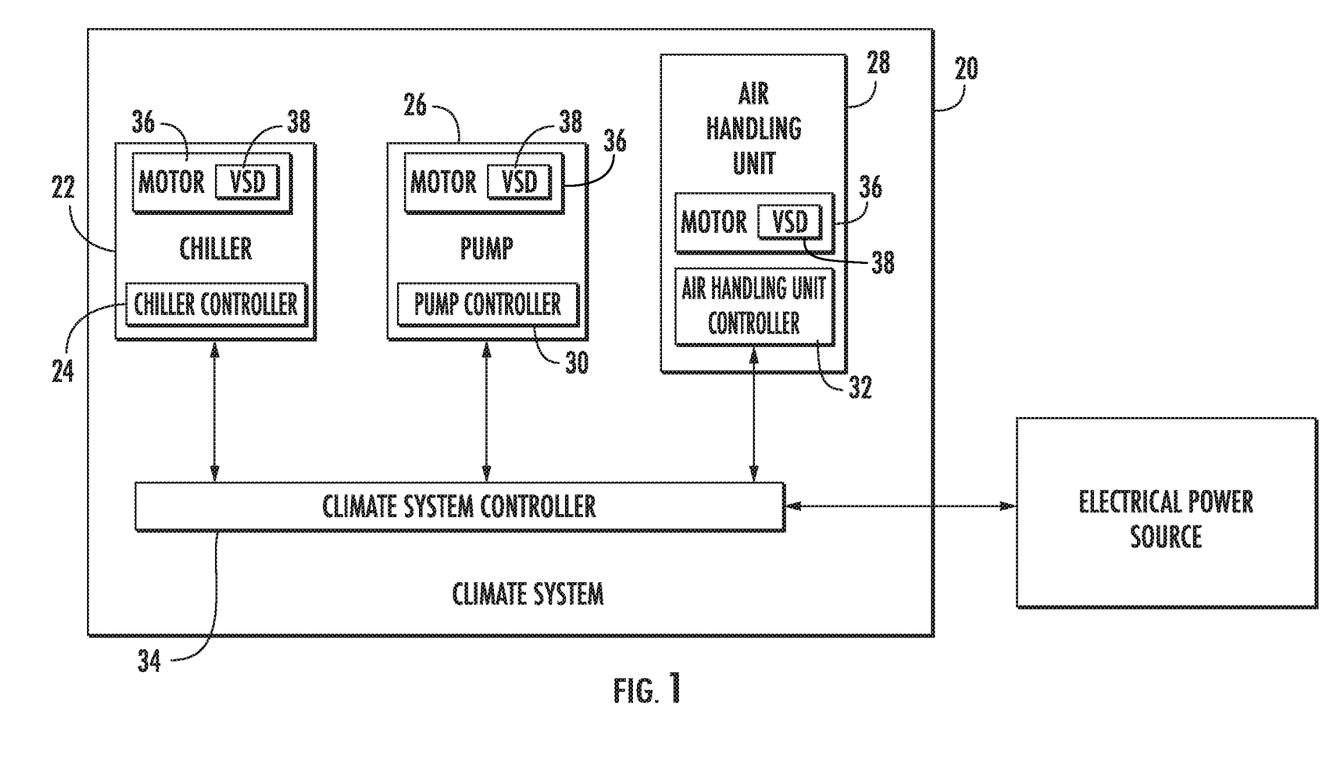
FIG. 1 schematically illustrates a climate system for a building.

FIG. 1 schematically illustrates an example climate system 20 for a building. The climate system 20 includes one or more chillers 22. The chiller 22 can be any known type of chiller. Though one chiller 22 is shown in FIG. 1, it should be understood the climate system 20 can include more chillers 22. The chiller 22 includes a chiller controller 24. The chiller 22 is operable to chill water for cooling the building. One or more pumps 26 pump chilled water from the chiller 22 to one or more air handling units 28 which utilize the chilled water to cool air for the building. Though one pump 26 and one air handling unit 28 are shown in FIG. 1, it should be understood that the climate system 20 can include more pumps 26 and/or more air handling units 28. For example, the building may include an air handling unit 28 on each level. The pump 26 and air handling unit 28 also include controllers 30, 32 (respectively).

The climate system 20 also includes a climate system controller 34. The chiller controller 24, pump controller 30, and air handling unit controller 32 are operable to communicate with the climate system controller 34. The climate system controller 34 is also operable to communicate with an electrical power source, which is in some examples and electrical grid, and vice versa. The climate system controller 34 can be in direct communication with the electrical power source, or can be in communication with the electrical power source via other components or modules in the building. The climate system controller 34 is also operable to aggregate the power demand for each of the individual components of the climate system 20, including the chiller 22, the pump 26, the air handling unit 28, or other components of climate systems which are known in the art. Each of the controllers discussed herein includes a computing device such as a processor and/or electronics which are programmed so that the controllers are operable to perform as discussed herein.

In one example, the chiller 22 includes a motor 36 which drives various components of the chiller 22 as is generally known in the art. The motor 36 includes a variable speed drive (VSD) 38 which is operable to vary frequency and voltage supplied to the motor 36. Likewise, the pump 26 and/or air handling unit 28 can include a motor 36 with a VSD 38. The respective controllers 24, 30, and 32 are operable to control the respective VSDs 38 in each component.

Figure 2:
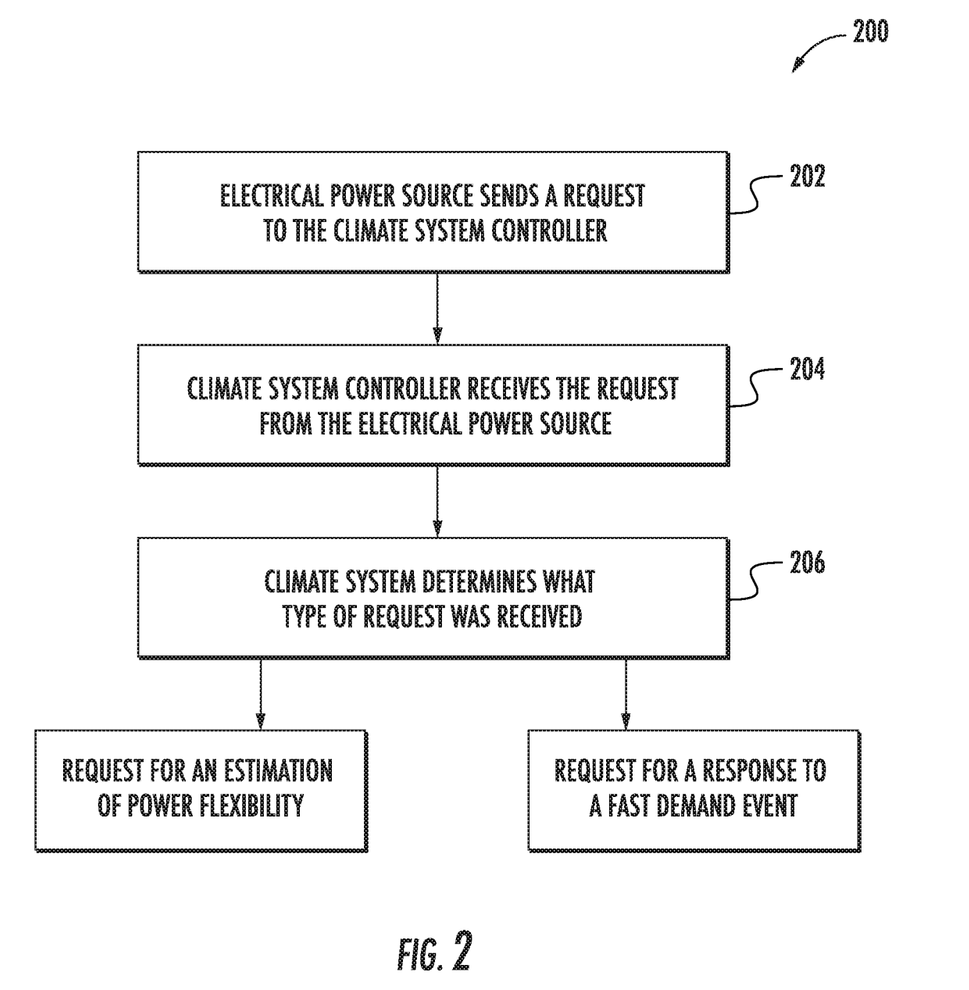
FIG. 2 schematically illustrates a method of demand-side management (DSM) of electric power demand for the climate system of FIG. 1.

FIG. 2 illustrates a method 200 for demand-side management (DSM) of electric power demand for the climate system 20. As discussed above, DSM enables an electrical power source to balance or distribute power in an efficient manner, and in some cases, to reduce overall electrical power consumption. In step 202, the electrical power source sends a request (or demand) to the climate system controller 34. In step 204, the climate system controller 34 receives the demand from the electrical power source. In step 206, the climate system controller 34 determines what type of request was received. There are two types of requests. The first is a request for an estimation of power flexibility for the climate system 20. The second is a request for a response to a fast demand event.

Figure 3:
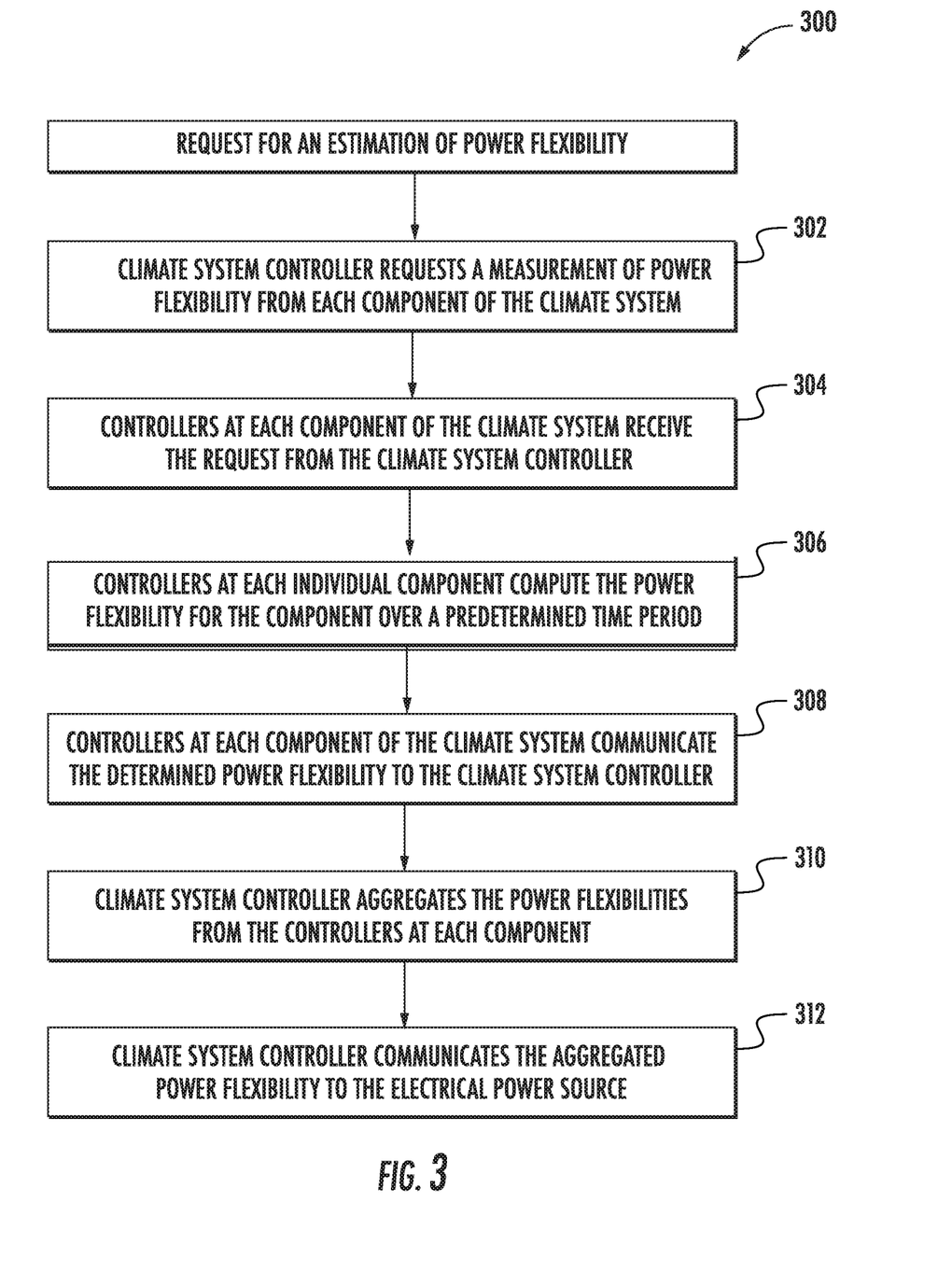
FIG. 3 schematically illustrates a method of estimating power flexibility of the climate system of FIG. 1.

FIG. 3 illustrates a method 300 for estimating power flexibility of the climate system 20. Power flexibility represents an acceptable increase or reduction (e.g., a change) in the power demand of the climate system 20 from a previous power demand. In some examples, the power flexibility is a range (e.g., it has an upper and lower bounds). An "acceptable" increase or reduction in the power demand of the climate system 20 means the climate system 20 is still able to meet predetermined requirements, such as occupant comfort requirements. As discussed above, the power demands of the climate system 20 may be based on building occupancy, external climate, occupant comfort requirements, a request from the electrical power source to reduce power consumption (discussed below in the method 400), or other variables. The power flexibility of the climate system 20 is a cumulative power flexibility of the individual components 22, 26, 28 of the climate system 20.

In step 302, the climate system controller 34 requests a measurement of power flexibility from each individual component of the climate system 20 (e.g., the chiller 22, the pump 26, the air handling unit 28, or other components of climate system 20 that are generally known in the art) via their respective controllers 24, 30, 32.

In step 304, the request from the climate system controller 34 is received at the controllers 24, 30, 32 of the individual components of the climate system 20.

In step 306, the controllers 24, 30, 32 compute the power flexibility for the respective individual components 22, 26, 28 over a predetermined time period. In some examples, the predetermined time period is communicated from the electrical power source to the climate system controller 34 in the request of step 302, and then is communicated to the controllers 24, 30, 32 of the individual components 22, 26, 28 by the climate system 34.

The power flexibility of each individual component 22, 26, 28 represents an acceptable increase or reduction in the power demand of the individual component 22, 26, 28. For each individual component 22, 26, 28, an "acceptable" increase or reduction in the power demand of the component 22, 26, 28 takes into account both the operating requirements of the component 22, 26, 28 and its respective sub-components and the demands on the component to meet the overall climate system 20 requirements.

The operating requirements of a component or sub-component maintain operation of the component or sub-component in a safe operating zone, in which the component or sub-component operates normally and stably, without causing damage to the component or sub-component. The safe operating zone for each individual component 22, 26, 28 and its sub-components are predefined by parameters ((such as temperature, pressure, flowrate, speed, etc.), which are stored in the individual controllers 24, 30, 32 or are retrievable by the individual controllers 24, 30, 32 from a remote data storage, such as via cloud technology. The parameters can also be communicated to the climate system controller 34. For instance, a normal operating zone for a motor 36 may include a maximum operating temperature parameter, above which the motor 36 overheats. As another example, a normal operating zone for a chiller 22 includes operating parameters that avoid surge conditions.

The power flexibility of each individual component 22, 26, and 28 also takes into account the demands on that component to meet overall climate system 20 requirements. For instance, the power flexibility of a chiller 22 may take into account the cooling demands of the building, the number of chillers 22 in the building, the type of motor employed by the chiller 22, etc. In a particular example, for a chiller 22 with a motor 36 having a VSD 38, the VSD 38 can be flexibly controlled by the chiller controller 24 to increase or decrease its power consumption and thus the power demand of the chiller 22 and chiller 22 output. Chiller 22 may have other sub-components which can likewise be flexibly controlled by the chiller controller 24, like inlet guide vanes, compressor(s), bypass streams such as hot gas bypass for a compressor, or other flexibly controllable components as are generally known in the art. Operation of these sub-components can be controlled by the chiller controller 24 in order to meet the power demand requirements of the climate system 20.

In step 308, the controllers 24, 30, 32 of the individual components 22, 26, 28 communicate the respective power flexibility for each component 24, 30, 32 to the climate system controller 34.

In step 310, the climate system controller 34 aggregates the respective power flexibilities from each of the individual components 22, 26, 28.

In step 312, the climate system controller 34 communicates the aggregated power flexibility to the electrical power source. The aggregated power flexibility reflects the overall power flexibility of the climate system 20.

Figure 4:
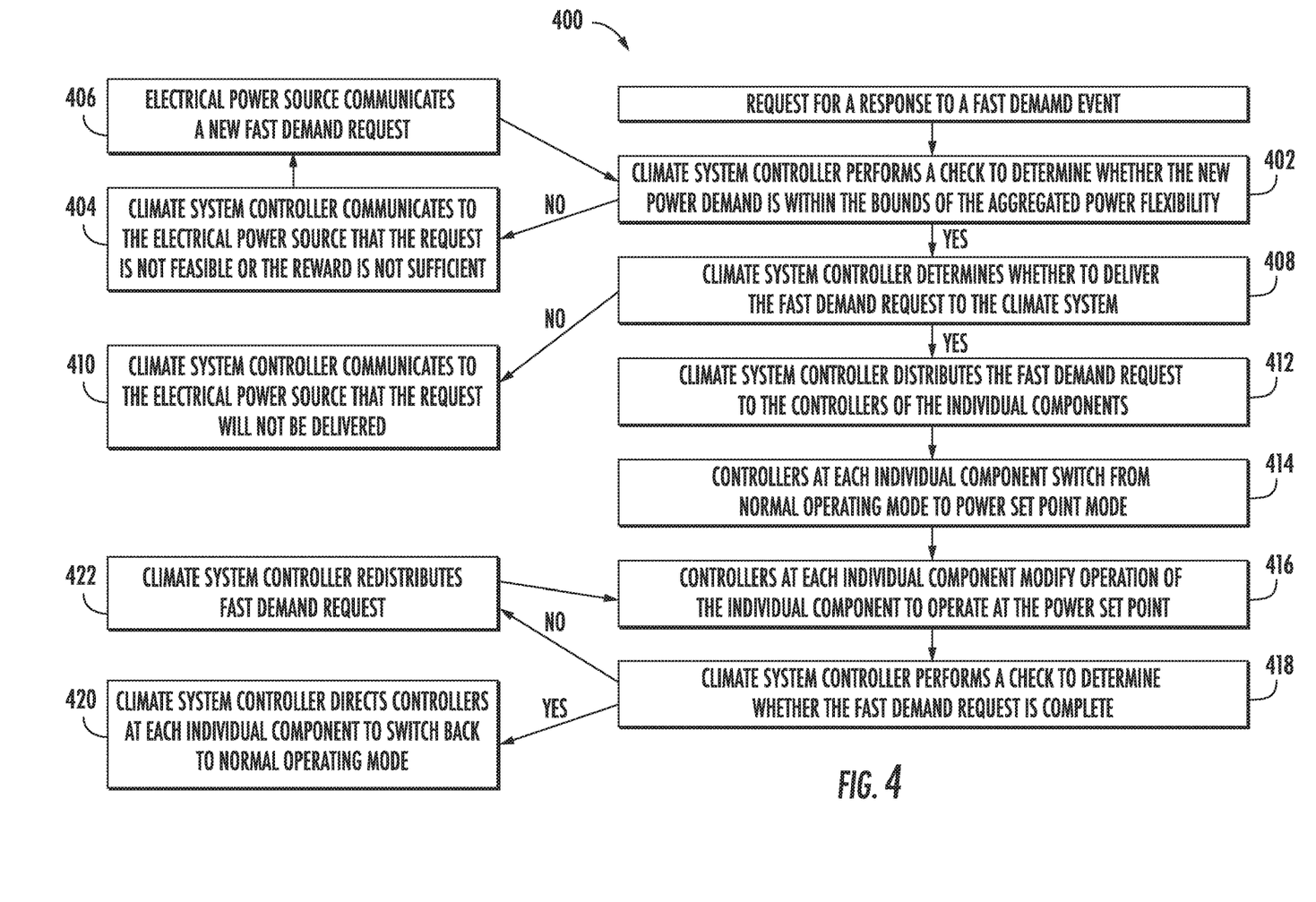
FIG. 4 schematically illustrates a method of responding to a fast demand response event from an electrical power source to the climate system of FIG. 1.

FIG. 4 illustrates a method 400 of responding to a fast demand request from the electrical power source. A fast demand request is a request from the electrical power source to quickly change the power demand of the climate system 20 to a new power demand. For instance, the electrical power source may send fast demand requests at times of peak electrical power usage. A fast demand request includes a reward. The reward is an offering from the electrical power source that represents a cost savings for electrical power in exchange for changing the power demand of the climate system 20. The reward can be expressed in the form of dollars per kW or dollars per kWh, for example.

In step 402, the climate system controller 34 performs a check or comparison to determine whether the new power demand is within the bounds of the aggregated power flexibility determined from the method 300 (FIG. 3) and whether the reward is sufficient. A request is not feasible if the new power demand is outside the bounds of the aggregated power flexibility determined from the method 300. A reward in insufficient if the benefit of the cost savings does not outweigh potential risk from changing operation of climate system 20 to meet the new power demand. One potential risk is components 22, 26, 28 and/or their sub-components approaching or exceeding operating parameters outside of the operating ranges that define a safe operating zone, as discussed above.

If no (e.g., if the reward is insufficient or if the new power demand is within the bounds of the aggregated power flexibility determined from the method 300), in step 404, the climate system controller 34 communicates to the electrical power source that the request is not feasible or the reward is not sufficient. In some examples, in step 406, the electrical power source communicates a new fast demand response request, and the method resets to step 402.

If the new power demand is within the bounds of the aggregated power flexibility determined from the method 300 (FIG. 3) and the reward is sufficient, in step 408, the climate system controller 34 determines whether to deliver the fast demand request to the climate system 20. In particular, the climate system 34 communicates with the individual controllers 24, 30, 32 to determine whether the new power demand is within a current acceptable power flexibility of the individual components 22, 26, 28, since the power flexibility of the individual component 22, 26, 28 may have changed since the fast demand request was received. Because the controllers 24, 30, 32 determine the flexibility according to method 300, as discussed above, the controllers 24, 30, 32 have the most up-to-date information regarding power flexibility of the individual components 22, 26, 28. If no, in step 410, the climate system controller 24 communicates to the electrical power source that the fast demand request will not be delivered.

If yes, in step 412, the climate system controller 34 distributes the fast demand request to the controllers 24, 30, 32 of the individual components 22, 26, 28 in the form of a power set point. Based on the new power demand for the climate system 20 and the power flexibilities for the individual components 22, 26, 28 that are determined according to the method 300, the climate system controller 34 determines and communicates a power set point to each individual component 22, 26, 28. The power set point represents an amount of power that the individual components 22, 26, 28 should consume while operating. The power set point is within the bounds of the power flexibility for each component 22, 26, 28.

In step 414, the controllers 24, 30, 32 of the individual components 22, 26, 28 switch from a normal operating mode to a power set point mode. In the power set point mode, the controllers 24, 30, 32 direct the individual components 22, 26, 28 and their respective sub-components to operate at the power set point from step 412 as will be discussed below. Because the controllers 24, 30, 32 of the individual components 22, 26, 28 directly receive the set points from the climate system controller 34 in step 412 and directly control the individual components 22, 26, 28, the response time of the individual components 22, 26, 28 to the fast demand request is decreased as compared to prior art methods.

In step 416, the controllers 24, 30, 32 in the power set point mode control the operation of the individual components 22, 26, 28 so that the individual components 22, 26, 28 operate at the power set point. Step 416 may include modifying the operation of certain sub-components of the individual components 22, 26, 28 such as motors 36 and the like. In some examples, the sub-components are configured to report certain operating parameters of the sub-components (such as temperature, pressure, flowrate, speed, etc.) to their respective controllers 24, 30, 32 and/or the climate system controller 34. Alternatively and/or additionally, individual components 22, 26, 28, may have other sensors for reporting operating parameters. The controllers 24, 30, 32 and/or climate system controller 34 can utilize the reported data to provide feedback control of the individual components 22, 26, 28 so that the individual components 22, 26, 28 remain operating in the power set point mode.

In a particular example, for a chiller 22 with a motor 36 having a VSD 38, inlet guide vanes, compressor(s), bypass streams such as hot gas bypass for a compressor, or other flexibly controllable sub-components, the chiller controller 24 can modify the operation of one of or more of these flexibility controllable sub-components in order to cause the chiller 22 to operate at the power set point. Furthermore, the VSD 38, inlet guide vanes, compressor(s), bypass streams such as hot gas bypass for a compressor, or other flexibly controllable sub-components may report certain operating parameters to the chiller controller 24 and/or climate system controller 34 to enable feedback control as discussed above.

In a more particular example, the chiller controller 24 modifies the operation of the chiller 22 primarily by controlling or modifying the operation of the VSD 38. The VSD 38 power demand is related to its speed (expressed as "rpm" or rotations per minute). In this example, an acceptable VSD 38 speed variation at the set point, rpm$_{sp}$ is calculated as shown in Equation 1, where k is a constant expressed as a percentage and sec is one second:

$$rpm_{SP} = \frac{k\%}{\text{sec}}$$

In other words, the variation of rpm$_{sp}$ (rpm$_{sp}$) is expressed as % k (or k/100) per second. As above, an "acceptable" VSD 38 speed variation is one in which the VSD 38 provides the requisite cooling for the chiller 22 to meet the requirements of the climate system 20 and in which the VSD 38 operates in a safe operating zone. A safe operating zone of the VSD 38 is one in which surge of the chiller 22 is avoided (though other parameters may also be defined, such as maximum operating temperature). In some examples, there is a range of operating conditions, e.g., VSD 38 speeds, which are in the safe operating zone.

Equation 2 shows a function for calculating minimum and maximum reachable VSD 38 speed at time T (speed_min and speed_max, respectively).

$$\text{speed\_min} = \left(-\frac{k}{100} + 1\right)^T * rpm_{SP}$$
$$\text{speed\_max} = \left(+\frac{k}{100} + 1\right)^T * rpm_{SP}$$

For example, time T can be the start of the fast demand event, a time representative of the start of the fast demand event plus a predetermined time window, or another time. In this way, Equation 2 shows how the speed of the VSD 38 changes over time with respect to the power set point.

The constant k is related to a maximum speed variation that is within the same operating zone for the VSD 38, which is discussed above. Thus, the constant k also takes into account the control capabilities of the chiller controller 24 and/or individual VSD 38 controller to change the operating speed of the VSD, e.g., the controller response times. The operating speed of the VSD 38 is controlled by the chiller controller 24 according to the equations above in order to maintain the VSD 38 and chiller 22 in safe operating conditions.

As discussed above, in some examples, the VSD 38 reports its speed or other operating parameters to the chiller controller 24 and/or climate system controller 34, which can provide feedback control over the VSD 38 so that the chiller 22 continues to operate at the power set point.

Though in the example of FIG. 1 the chiller 22 has a single VSD 38, it should be understood that the chiller 22 can have multiple VSDs 38 in other examples. If the chiller 22 has multiple VSDs 38, the power consumed by the multiple VSDs 38 is cumulative. In other words, in this example, the multiple VSDs 38 would be operated so that their cumulative power consumption meets the power set point for the chiller 22. Likewise, the climate system 20 may have multiple chillers 22, and in this example, the power consumption and cooling output of the chillers 22 is cumulative.

In step 418, the climate system controller 34 performs a check to determine whether the fast demand request is complete. In one example, the climate system controller 34 performs the check of step 418 after a predetermined time that is communicated to the climate system controller 34 from the electrical power source as part of the fast demand request. If yes, in step 420, the climate system controller 34 directs the controllers 24, 30, 32 of the individual components 22, 26, 28 to switch back to the normal operating mode. If no, in step 422, the climate system controller 34 redistributes the fast demand request and the controllers 24, 30, 32 continue to operate the individual components 22, 26, 28 in the power set point mode as in step 416.

Though the foregoing methods are described with respect to the climate system 20 with a chiller 22, a pump 26, and an air handling unit 28, other climate systems may include other individual components as is generally known in the art. It should be understood that the foregoing method are applicable to these other components as well.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of estimating power flexibility for a climate system, comprising:
   receiving a component power flexibility measurement from at least two components of the climate system;
   aggregating the component power flexibility measurement from each of the components of the at least two components of the climate system to determine a climate system power flexibility;
   receiving a request for a fast demand response from an electrical power source, the request for the fast demand response including a power demand, wherein the power demand includes a reward;
   determining whether the power demand is within the climate system power flexibility;
   determining whether the reward is sufficient;
   determining whether the power demand is within an updated acceptable power flexibility for the each of the components of the at least two components of the climate system; and
   delivering the fast demand response to the each of the components of the at least two components of the climate system when the power demand is within the climate system power flexibility, the reward is sufficient, and the power demand is within the updated power flexibility for the each of the components of the at least two components of the climate system, or communicating to the electrical power source that the request for the fast demand response will not be delivered when the power demand is not within the updated power flexibility for the each of the components of the at least two components of the climate system, wherein the delivering is performed by a climate system controller.

2. The method of claim 1, further comprising communicating the climate system power flexibility to the electrical power source.

3. The method of claim 1, further comprising receiving a request for the climate system power flexibility from the electrical power source prior to the step of receiving the component power flexibility measurement.

4. The method of claim 3, wherein the electrical power source is a smart grid.

5. The method of claim 4, wherein the smart grid sends the request for the climate system power flexibility at a time of peak electrical demand.

6. The method of claim 1, wherein one of the at least two components of the climate system includes at least one of a chiller, a pump, and an air handling unit.

7. The method of claim 1, wherein the updated power flexibility for the each of the components of the at least two components of the climate system is determined at the each of the components of the at least two components of the climate system.

8. The method of claim 7, wherein the updated power flexibility for the each of the components of the at least two components of the climate system is determined by a controller at the each of the components of the at least two components of the climate system and is communicated to the climate system.

9. The method of claim 1, wherein the step of determining the updated power flexibility for the each of the components of the at least two components of the climate system is performed after the steps of determining whether the power demand is within the climate system power flexibility and determining whether the reward is sufficient.

10. A method of responding to a fast demand request from an electrical power source for a climate system that includes at least two components, comprising:
  determining whether a new power demand from the electrical power source is within an aggregated power flexibility of the climate system, the climate system including the at least two components, wherein the new power demand includes a reward;
  determining whether the power demand is within an updated power flexibility for each of the components of the at least two components of the climate system;
  distributing a power set point to the each of the components of the at least two components of the climate system when the new power demand is within the aggregated power flexibility of the climate system, the reward is sufficient, and the power demand is within the updated power flexibility for the each of the components of the at least two components of the climate system, or communicating to the electrical power source that the new power demand will not be delivered when the power demand is not within the updated power flexibility for the each of the components of the at least two components of the climate system; and
  operating the each of the components of the at least two components at the power set point of the each of the components of the at least two components.

11. The method of claim 10, further comprising performing a check to determine whether the fast demand request is complete after the distributing step.

12. The method of claim 11, further comprising redistributing the fast demand request to the each of the components of the at least two components if the fast demand request is not complete.

13. The method of claim 10, wherein the power set point of the each of the components of the at least two components is within a power flexibility of the respective component.

14. The method of claim 10, wherein one of the at least two components includes at least one of a chiller, a pump, and an air handling unit.

15. The method of claim 14, wherein one of the at least two components includes the chiller, and wherein the chiller includes a motor having a variable speed drive.

16. The method of claim 15, wherein the operating includes changing the speed of the variable speed drive.

17. The method of claim 10, wherein the distributing is performed by a climate system controller, and wherein the climate system controller determines the power set point for the each of the components of the at least two components.

18. The method of claim 17, wherein the climate system controller distributes the power set point for the each of the components of the at least two components to a controller at the each of the components of the at least two components.

19. The method of claim 18, further comprising communicating one or more operating parameters from at least one of the at least two components to at least one of the climate system controller and the controller at the each of the components of the at least two components.

* * * * *